(12) United States Patent
Shimizu et al.

(10) Patent No.: US 10,938,829 B2
(45) Date of Patent: Mar. 2, 2021

(54) CAR SHARING SYSTEM

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Takahiro Shimizu, Aichi (JP); Hidenobu Hanaki, Aichi (JP); Junji Murase, Aichi (JP); Yosuke Doi, Aichi (JP); Yuichiro Haruna, Oyama (JP); Masaki Oshima, Aichi (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 162 days.

(21) Appl. No.: 16/151,924

(22) Filed: Oct. 4, 2018

(65) Prior Publication Data
US 2019/0109854 A1    Apr. 11, 2019

(30) Foreign Application Priority Data

Oct. 10, 2017 (JP) .............................. JP2017-196934

(51) Int. Cl.
| | |
|---|---|
| *H04L 29/06* | (2006.01) |
| *H04W 4/40* | (2018.01) |
| *H04W 12/06* | (2021.01) |
| *H04W 4/80* | (2018.01) |
| *H04W 4/08* | (2009.01) |

(52) U.S. Cl.
CPC ........ *H04L 63/104* (2013.01); *H04L 63/0876* (2013.01); *H04W 4/40* (2018.02); *H04W 12/06* (2013.01); *H04W 4/08* (2013.01); *H04W 4/80* (2018.02)

(58) Field of Classification Search
CPC combination set(s) only.
See application file for complete search history.

(56) References Cited

U.S. PATENT DOCUMENTS

| | | | | |
|---|---|---|---|---|
| 2015/0363986 A1* | 12/2015 | Hoyos | ..................... | H04W 4/40 340/5.61 |
| 2016/0098870 A1* | 4/2016 | Bergerhoff | ......... | G07C 9/00571 340/5.61 |
| 2017/0118218 A1* | 4/2017 | Koottayi | ............... | H04L 63/101 |

FOREIGN PATENT DOCUMENTS

| | | |
|---|---|---|
| JP | 2012-221224 A | 11/2012 |
| JP | 2013-037568 A | 2/2013 |
| JP | 2014-039391 A | 2/2014 |
| JP | 2016-071834 A | 5/2016 |
| JP | 2016-115077 A | 6/2016 |

* cited by examiner

*Primary Examiner* — Tri M Tran
(74) *Attorney, Agent, or Firm* — Greenblum & Bernstein, P.L.C.

(57) ABSTRACT

A car sharing system includes a car share device and a usage right lending unit that allows multiple users including a first user and a second user to use the vehicle. If the second user requests for usage of the vehicle when the vehicle is being rented to the first user, the usage right lending unit allows the second user to use the vehicle as long as the second user satisfies a lending condition.

3 Claims, 4 Drawing Sheets

Fig.6

CAR SHARING SYSTEM

CROSS-REFERENCE TO RELATED APPLICATIONS

This application is based upon and claims the benefit of priority from prior Japanese Patent Application No. 2017-196934, filed on Oct. 10, 2017, the entire contents of which are incorporated herein by reference.

FIELD

This disclosure relates to a car sharing system that shares a vehicle with a number of people.

BACKGROUND

Japanese Laid-Open Patent Publication Nos. 2016-115077 and 2016-71834 describe a car sharing system that shares a vehicle with a number of people. In such type of a car sharing system, for example, after registering for usage of the car share system, a reservation for a car is made with a mobile terminal (e.g., smartphone) to obtain permission to use the vehicle during the reserved time.

SUMMARY

In the car sharing system of the prior art, when a vehicle has already been reserved (rented), only the person who made the reservation is allowed to use the vehicle, and other users cannot use the vehicle. However, a user other than the one who reserved the vehicle may wish to use the vehicle.

One embodiment of a car sharing system includes a car share device and a usage right lending unit. The car share device is installed in a vehicle and configured to verify an electronic key ID used by an electronic key system of the vehicle. The car share device is configured to communicate with a mobile terminal that is operable as a vehicle key when code information is registered to the mobile terminal. The car share device is further configured to authenticate the code information through wireless communication with the mobile terminal and permit actuation of an on-board device by verifying the electronic key ID with the electronic key system when the mobile terminal is operated to actuate the on-board device. The usage right lending unit allows multiple users including a first user and a second user to use the vehicle. If the second user requests for usage of the vehicle when the vehicle is being rented to the first user, the usage right lending unit allows the second user to use the vehicle as long as the second user satisfies a lending condition.

Other embodiments and advantages thereof will become apparent from the following description, taken in conjunction with the accompanying drawings, illustrating by way of example the principles of the invention. It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a car sharing system will now be described with reference to FIGS. 1 to 4.

Figure 1:
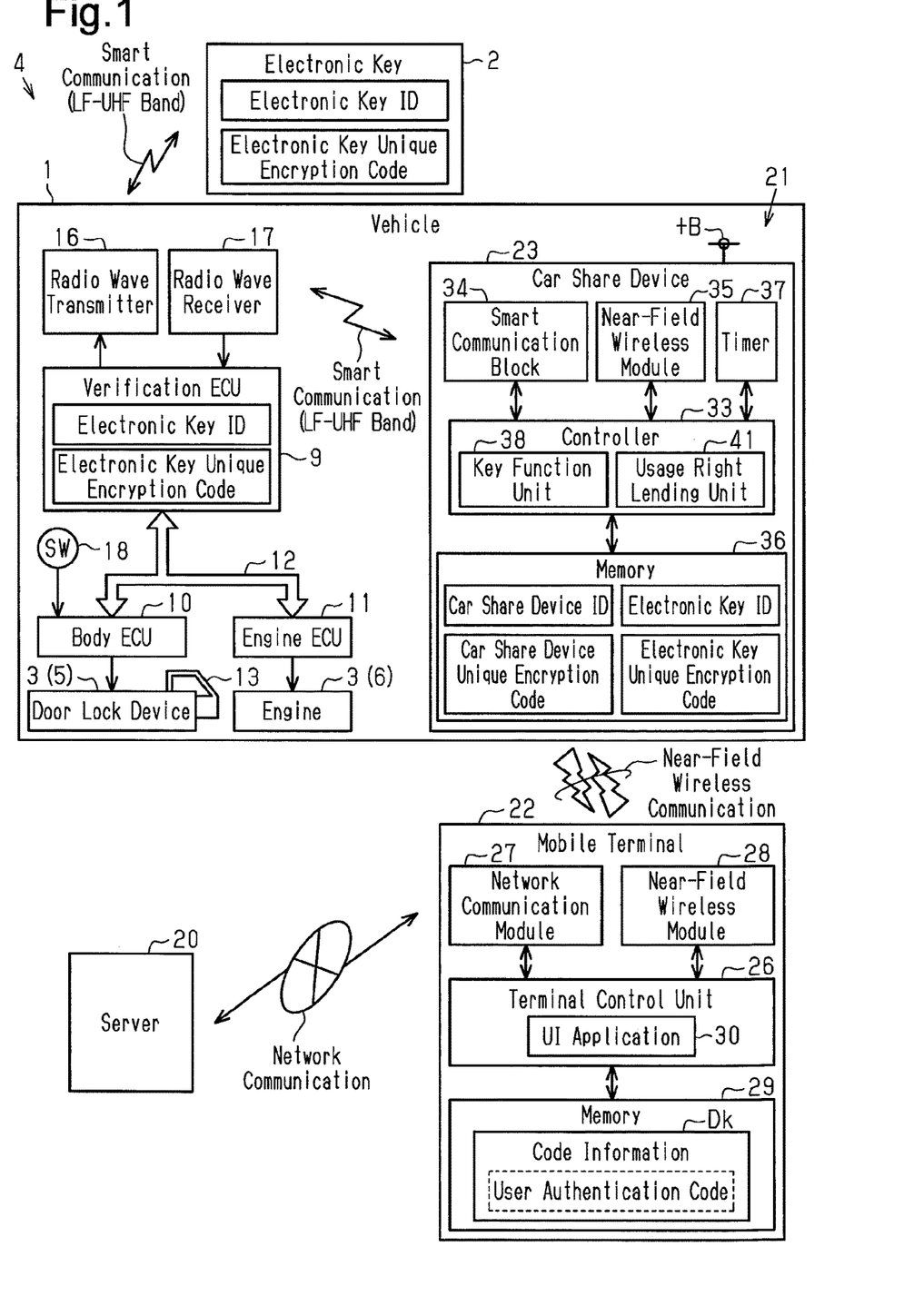
FIG. 1 is a schematic block diagram illustrating one embodiment of a car sharing system.

As illustrated in FIG. 1, a vehicle 1 is provided with an electronic key system 4. In one embodiment, the electronic key system 4 includes an electronic key 2 (vehicle key) and a verification electronic control unit (ECU) 9 that verifies the ID of the electronic key 2 through wireless communication with the electronic key 2. The verification ECU 9 executes or permits actuation of an on-board device 3 upon ID verification accomplishment of the electronic key 2. The electronic key system 4, which is a key-operation-free system, performs electronic key ID verification (also referred to as smart verification) through short range wireless communication initiated by the vehicle 1 (verification ECU 9). In the key-operation-free system, electronic key ID verification is automatically performed without directly operating the electronic key 2. The on-board device 3 may include, but not limited to, for example, a door lock device 5 and an engine 6.

The vehicle 1 includes the verification ECU 9, a body ECU 10 that manages the power supply for on-board electrical devices, and an engine ECU 11 that controls the engine 6. The body ECU 10 and the engine ECU 11 are each referred to as an on-board device ECU. The ECUs 9 to 11 are electrically connected to one another by a communication line 12 in the vehicle 1. The communication line 12 is, for example, a Controller Area Network (CAN), a Local Interconnect Network (LAN), or a combination of these networks. The verification ECU 9 and the electronic key 2 each include a memory (not illustrated) that stores an electronic key ID and an electronic key unique encryption code. The electronic key ID and the electronic key unique encryption code are information unique to the electronic key 2 that is registered to the vehicle 1 and used for electronic key ID verification. The body ECU 10 controls the door lock device 5 that locks and unlocks the vehicle door 13.

The electronic key system 4 further includes a radio wave transmitter 16 and a radio wave receiver 17 that are arranged in the vehicle 1. For example, the radio wave transmitter 16 may include an exterior transmitter (not illustrated) that transmits radio waves to the outside of the vehicle 1 and an interior transmitter (not illustrated) that transmits radio waves to the inside of the vehicle 1. The radio wave transmitter 16 transmits radio waves on the low frequency (LF) band. The radio wave receiver 17 receives radio waves on the ultrahigh frequency (UHF) band. Accordingly, in the electronic key system 4, the verification ECU 9 communicates with the electronic key 2 through LF-UHF bidirectional communication.

As the electronic key 2 enters a communication area formed by a wake signal on LF radio waves transmitted from the radio wave transmitter 16, the electronic key 2 receives the wake signal and shifts from a standby state to an activated state. Upon activation of the electronic key 2, the verification ECU 9 performs ID verification (smart verification) on the electronic key 2. In a non-restrictive example, the smart verification performed between the electronic key 2 and the verification ECU 9 includes electronic key ID verification that authenticates the electronic key 2 and challenge-response authentication that uses the electronic key unique encryption code. The electronic key ID verification performed under a situation in which the electronic key 2 is located outside the vehicle 1 is referred to as exterior smart verification. When exterior smart verification is accomplished, the verification ECU 9 permits or performs locking or unlocking of the vehicle door 13 with the body ECU 10.

The electronic key ID verification performed under a situation in which the electronic key 2 is located inside the vehicle 1 is referred to as interior smart verification. When interior smart verification is accomplished, the verification ECU 9 permits the shifting of devices supplied with power when an engine switch 18 is operated. For example, when the engine switch 18 is operated in a state in which the brake pedal is depressed, the verification ECU 9 starts the engine 6 with the engine ECU 11.

The vehicle 1 is provided with a car sharing system 21 that allows the vehicle 1 to be shared by a number of people. In the present example, the car sharing system 21 includes a car share device 23 installed in the vehicle 1. The car share device 23 is configured to verify the electronic key ID used by the electronic key system 4 of the vehicle 1. Further, the car share device 23 is configured to establish wireless communication with a mobile terminal 22. Encrypted code information Dk obtained from, for example, an external device such as a server 20 is registered to the mobile terminal 22. The car share device 23 obtains the code information Dk from the mobile terminal 22 and authenticates the code information Dk. In the present example, the car share device 23 includes an encryption code (car share device unique encryption code) used to decode the code information Dk. The code information Dk is authenticated when decoded. After the authentication process is accomplished, the mobile terminal 22 is allowed to transmit requests for actuating the on-board device 3. The mobile terminal 22 may be, for example, a smartphone. Preferably, the code information Dk is, for example, a one-time key (one-time password) that can be used only once.

The car share device 23 is independent from the hardware configuration of the electronic key system 4 and may be retrofitted to the vehicle 1. The car share device 23, for example, functions as an electronic key (vehicle key) that is valid only during the reserved time of the vehicle 1 and is similar to a spare key. In the present example, the car share device 23 cooperates with the mobile terminal 22 so that the mobile terminal 22 functions as a vehicle key in place of the electronic key 2. The car share device 23 has an electronic key function that is switched between a valid state and an invalid state. A state in which the electronic key function of the car share device 23 is valid is equivalent to a state in which an electronic key exists in the vehicle 1. A state in which the electronic key function is invalid is equivalent to a state in which an electronic key does not exist in the vehicle 1. The car share device 23 is supplied with power from a battery +B of the vehicle 1.

In a non-restrictive example, the mobile terminal 22 includes a terminal control unit 26, a network communication module 27, a near-field wireless communication module 28, and a memory 29. The terminal control unit 26 controls the operation of the mobile terminal 22. The network communication module 27 is used to perform network communication between the mobile terminal 22 and an external device such as the server 20. The near-field wireless communication module 28 is used to perform near-field wireless communication between the mobile terminal 22 and the car share device 23. The memory 29 is a data rewritable memory. The mobile terminal 22 obtains the code information Dk from the server 20 via the network communication module 27 and writes the code information Dk to the memory 29. The near-field wireless communication is performed in compliance with, for example, Bluetooth (registered trademark), preferably, Bluetooth® Low Energy (BLE).

A user interface (UI) application 30 is installed in the mobile terminal 22 to manage operation of the car sharing system 21. The UI application 30 is, for example, downloaded from the server 20 and installed in the terminal control unit 26. In the present example, a user authentication code is registered to the memory 29 of the mobile terminal 22. The user authentication code is used when the mobile terminal 22 communicates with the car share device 23 of the vehicle 1 to actuate the on-board device 3 in accordance with the operation of the mobile terminal 22. The user authentication code may be, for example, a random number of which value changes whenever generated. The user authentication code may be registered in advance to the car sharing system 21 or generated when the vehicle 1 is used.

In a non-restrictive example, the car share device 23 includes a controller 33, a smart communication block 34, a near-field wireless module 35, a memory 36, and a timer 37. The controller 33 controls operation of the car share device 23. The smart communication block 34 is used to establish smart communication (short range wireless communication) between the car share device 23 and the electronic key system 4 (verification ECU 9). The near-field wireless module 35 is used to establish near-field wireless communication between the mobile terminal 22 and the car share device 23.

The memory 36 is a data rewritable memory. The memory 36 stores a car share device ID, a car share device unique encryption code, the electronic key ID, and the electronic key unique encryption code. The car share device ID and the car share device unique encryption code are information unique to the car share device 23. The car share device unique encryption code is used to decode the code information Dk used for encrypted communication between the mobile terminal 22 and the car share device 23. The car share device unique encryption code may be stored in the server 20. The mobile terminal 22 may obtain the code information Dk, which is encrypted by the car share device unique encryption code, from the server 20. The car share device ID is, for example, associated with a vehicle ID (vehicle body number). This associates the car share device 23 with the vehicle 1. As described above, the electronic key ID and the electronic key unique encryption code are information unique to the electronic key 2 and used for electronic key ID verification (in the present example, smart verification) performed with the electronic key system 4. The timer 37 manages the date and time in the car share device 23. The timer 37 is implemented by, for example, a soft timer.

The car share device 23 includes a key function unit 38 that performs electronic key ID verification (in the present example, smart verification) through smart communication established by the smart communication block 34 between the electronic key system 4 (verification ECU 9) and the car share device 23. The key function unit 38 is arranged in the controller 33. For example, the car share device 23 includes one or more processors and a memory storing one or more instructions. The one or more processors execute instructions so that the controller 33 functions as the key function unit 38. The key function unit 38 obtains the code information Dk from the mobile terminal 22 and authenticates the code information Dk. When authentication of the code information Dk is accomplished in a normal manner, the key function unit 38 is allowed to perform electronic key ID verification through smart communication with the verification ECU 9. For example, when the mobile terminal 22 is operated to actuate the on-board device 3, the key function unit 38 performs electronic key ID verification (in the present example, smart verification) between the car share device 23 and the verification ECU 9 through a process similar to the electronic key ID verification performed between the electronic key 2 and the verification ECU 9. When electronic key ID verification is accomplished, actuation of the on-board device 3 is performed or permitted in accordance with operation of the mobile terminal 22.

The car sharing system 21 includes a usage right lending unit 41 that permits a plurality of users to use the share vehicle (vehicle 1). For example, the usage right lending unit 41 is arranged in the controller 33 of the car share device 23. In this case, a processor of the car share device 23 executes instructions so that the controller 33 functions as the usage right lending unit 41. For example, when the vehicle 1 is being rented to a first user, a second user may wish to use the vehicle 1. If the second user requests for usage of the vehicle 1 to the usage right lending unit 41 when the vehicle 1 is being rented to the first user, as long as the second user satisfies a certain lending condition, the usage right lending unit 41 allows the second user to use the vehicle 1. In a non-restrictive example, the usage right lending unit 41 allows multiple users to use the vehicle 1 during the same period. For example, the usage right lending unit 41 allows multiple users to use the vehicle 1 during the same period based on a group ID assigned to the multiple users.

The operation of the car sharing system 21 will now be described with reference to FIGS. 2 to 6.

Figure 2:
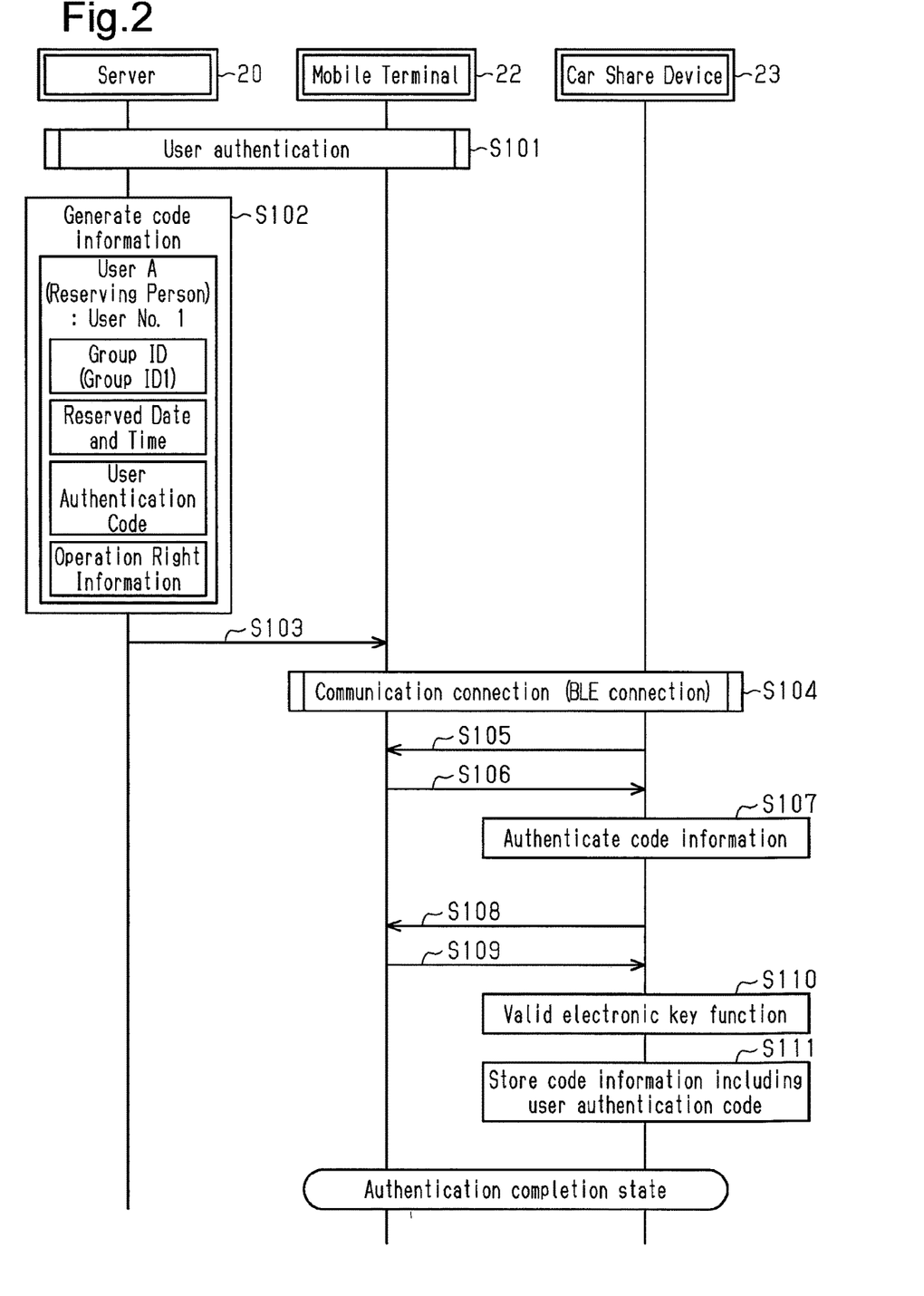
FIG. 2 is a diagram illustrating an example communication sequence for code information authentication.

As illustrated in FIG. 2, in step S101, the server 20 authenticates the user of the mobile terminal 22 (user reserving vehicle 1) through network communication with the mobile terminal 22 (UI application 30). For example, user authentication is performed with a user ID and password input to the mobile terminal 22 (UI application 30). In the user authentication, a usage reservation procedure is performed to register reservation information of the vehicle 1. The reservation information of the vehicle 1 includes, for example, the reserved vehicle and the reserved date and time. After the server 20 authenticates the user with the user ID and the password, the process proceeds to step S102. If user authentication is not accomplished, the process is forcibly terminated.

In step S102, the server 20 generates the code information Dk. For example, the car share device unique encryption code of the car share device 23, which is installed in the vehicle 1 (reserved vehicle), may be registered to the server 20. In the example of FIG. 2, user A reserves the vehicle 1 from his or her mobile terminal 22. Then, a group ID is assigned to the user A. In the present example, group ID1 is assigned to user A.

In a non-restrictive example, the server 20 uses an encryption expression (encryption algorithm) to encrypt plain text with the car share device unique encryption code and obtain the encrypted text as the code information Dk. In the present example, the encrypted plain text may include the group ID assigned to the user (reserving person), the reserved date and time of the vehicle 1, a terminal ID unique to the mobile terminal 22, the user authentication code used as an encryption code for establishing encrypted communication between the mobile terminal 22 and the car share device 23, and operation right information indicating the contents of the right to use the vehicle 1. Accordingly, the code information Dk includes the group ID, the reserved date and time, the terminal ID, the user authentication code, and the operation right information. In a non-restrictive example, the operation right information includes, for example, the upper limit of the number of times the engine 6 is allowed to be started and the content of operations that the user is allowed to perform (e.g., permission of only opening and closing of glove compartment).

In step S103, the server 20 transmits the code information Dk to the mobile terminal 22 through network communication.

In step S104, the mobile terminal 22 (UI application 30) performs near-field wireless communication (in the present example, BLE) connection with the car share device 23. For example, the car share device 23 cyclically transmits advising packets. When the mobile terminal 22 receives an advising packet in the reservation period during which the vehicle 1 is rented, the mobile terminal 22 transmits a communication connection request to the car share device 23. In response to the communication connection request from the mobile terminal 22, the car share device 23 establishes BLE communication with the mobile terminal 22. The car share device 23 transmits a communication connection acknowledgement notifying the establishment of BLE communication to the mobile terminal 22.

In step S105, the car share device 23 transmits a code information request that requests for the code information Dk to the mobile terminal 22. In step S106, in response to the code information request, the UI application 30 of the mobile terminal 22 transmits the code information Dk to the car share device 23.

In step S107, the car share device 23 authenticates the code information Dk. In the present example, the car share device 23 uses the car share device unique encryption code to decode the code information Dk. When decoding of the code information Dk is accomplished, the car share device 23 determines that the code information Dk transmitted from the mobile terminal 22 is correct. When authentication of the code information Dk is accomplished, the car share device 23 extracts the group ID, the reservation date and time, the terminal ID, the user authentication code, and the operation right information from the code information Dk. When authentication of the code information Dk is not accomplished, the car share device 23 determines that the code information Dk is incorrect and shuts down communication.

In step S108, the car share device 23 transmits the user authentication code of the code information Dk to the mobile terminal 22. In step S109, the UI application 30 of the mobile terminal 22 transmits the electronic key function validation request to the car share device 23. The electronic key function validation request is a request for switching the electronic key function (key function unit 38) of the car share device 23 to a valid state.

In step S110, in response to the electronic key function validation request from the mobile terminal 22, the car share device 23 switches the electronic key function (key function unit 38) from an invalid state to a valid state. This allows the car share device 23 to execute electronic key ID verification through LF-UHF bidirectional communication with the verification ECU 9.

In step S111, the car share device 23 stores the information extracted from the code information Dk, namely, the user authentication code, the group ID, and the like, in the memory 36. After the information extracted from the user authentication code is stored in the memory 36, the mobile terminal 22 and the car share device 23 both shift to an authentication completion state. This allows the mobile terminal 22 to be used in place of the electronic key 2 as an electronic key (vehicle key) of the vehicle 1.

Figure 3:
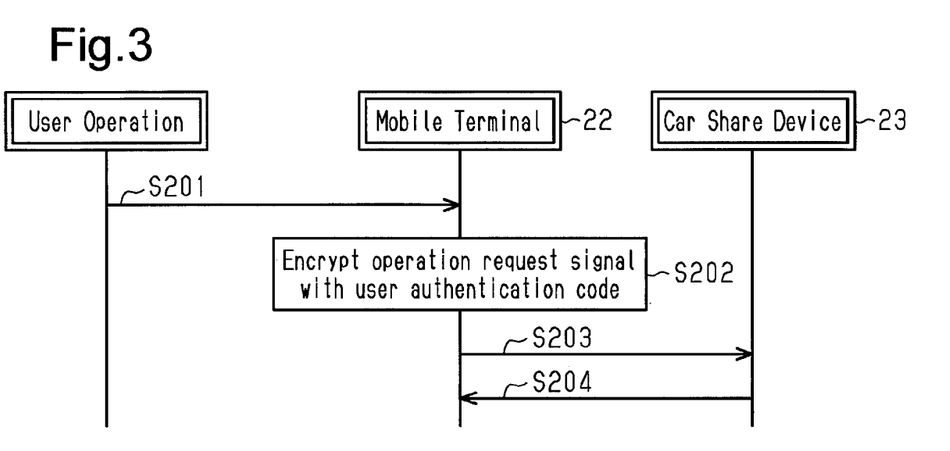
FIG. 3 is a diagram illustrating an example communication sequence for a case in which a mobile terminal is operated to actuate an on-board device.

As illustrated in FIG. 3, in step S201, the user operates and activates an operation request button of the mobile terminal 22 which is in the authentication completion state. The operation request button is used to actuate the on-board device 3 and may be, for example, an unlock request button for unlocking the vehicle door 13, a lock request button for locking the vehicle door 13, an engine start button for starting the engine 6, or the like.

In step S202, the UI application 30 of the mobile terminal 22 encrypts an operation request signal, which corresponds to the operation request button, with the user authentication code. In a non-restrictive example, the operation request signal may include a device actuation command corresponding to the operation request button, the electronic key ID, and the electronic key unique encryption code.

In step S203, the UI application 30 of the mobile terminal 22 transmits the encrypted operation request signal to the car share device 23 through near-field wireless communication (BLE communication).

In step S204, when the car share device 23 receives the operation request signal, the car share device 23 transmits a request acceptance response to the mobile terminal 22. Then, the car share device 23 communicates with the electronic key system 4 and actuates the on-board device 3 in accordance with the received operation request signal. In a non-restrictive example, the car share device 23 establishes smart communication with the verification ECU 9 of the electronic key system 4 through the smart communication block 34 and sends a device actuation command and the electronic key ID to the verification ECU 9. The verification ECU 9 performs electronic key ID verification. When the electronic key ID verification is accomplished, the verification ECU 9 sends the device actuation command to the on-board device ECU of the corresponding on-board device 3 to actuate the corresponding on-board device 3.

For example, if the device actuation command is an unlock request command for the vehicle door 13, the body ECU 10 actuates the door lock device 5 to unlock the vehicle door 13. If the device actuation command is a lock request command for the vehicle door 13, the body ECU 10 actuates the door lock device 5 to lock the vehicle door 13. If the device actuation command is a starting request command for the engine 6, the engine ECU 11 permits starting of the engine 6. For example, if the engine switch 18 is operated when the brake pedal is depressed, the engine ECU 11 starts the engine 6. In addition to electronic key ID verification, challenge-response authentication using the electronic key unique encryption code may be performed between the verification ECU 9 and the car share device 23 if necessary. In this manner, smart verification may be performed between the car share device 23 and the verification ECU 9 in the same manner as the smart verification performed between the electronic key 2 and the verification ECU 9.

Figure 4:
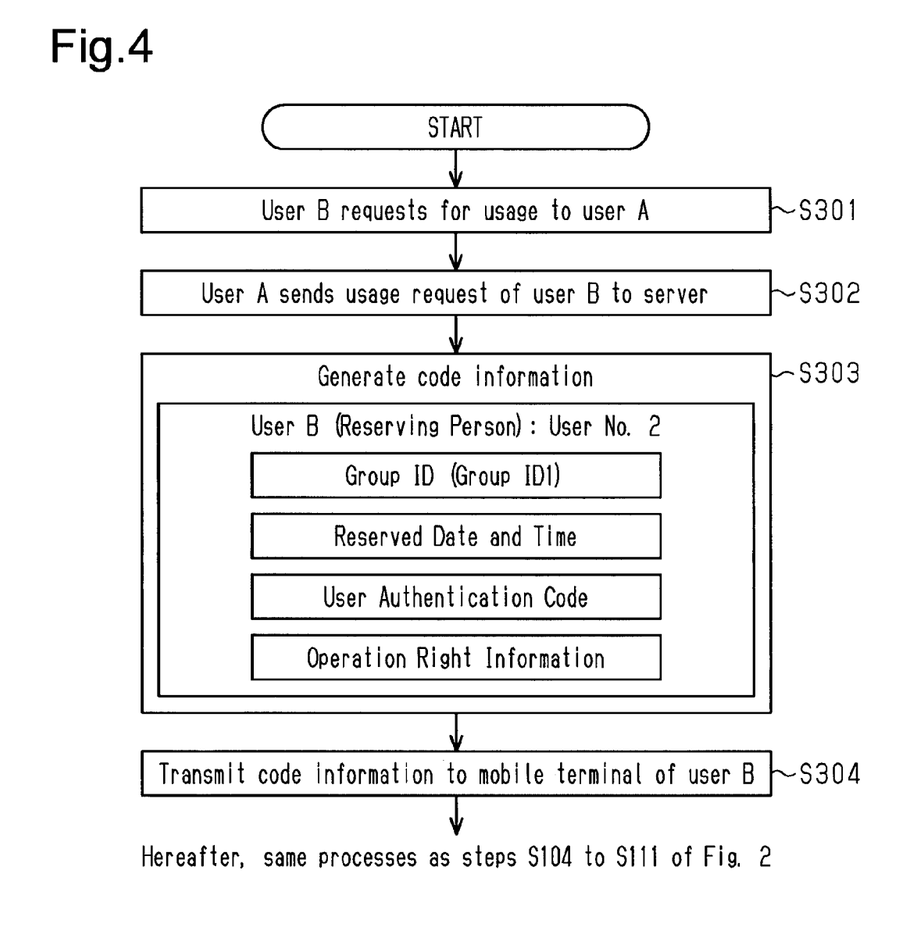
FIG. 4 is a flowchart illustrating an example process executed when another user uses the rented vehicle.

FIG. 4 is a flowchart illustrating a process for a case in which another user (e.g., user B) uses the vehicle 1 that is being rented to the user A. The example of FIG. 4 illustrates a case when user B, who belongs to the same group as user A (group ID1), uses the vehicle 1.

In step S301, user B sends a request for usage of the vehicle 1 to user A. For example, when user B operates his or her mobile terminal 22 to request for usage of the vehicle, the mobile terminal 22 of user B transmits usage request information of the vehicle 1 to the mobile terminal 22 of user A through network communication or near-field wireless communication. The usage request information may include the terminal ID of the mobile terminal 22 of user B and the reserved date and time of the vehicle 1 registered by user B.

In step S302, user A sends the usage request, which has been received from user B, to the server 20. For example, user A operates his or her mobile terminal 22 and transmits the usage request information of user B to the server 20. When the server 20 receives the usage request information of user B via the mobile terminal 22 of user A, the server 20 determines that user B belongs to the same group as user A.

Figure 5:
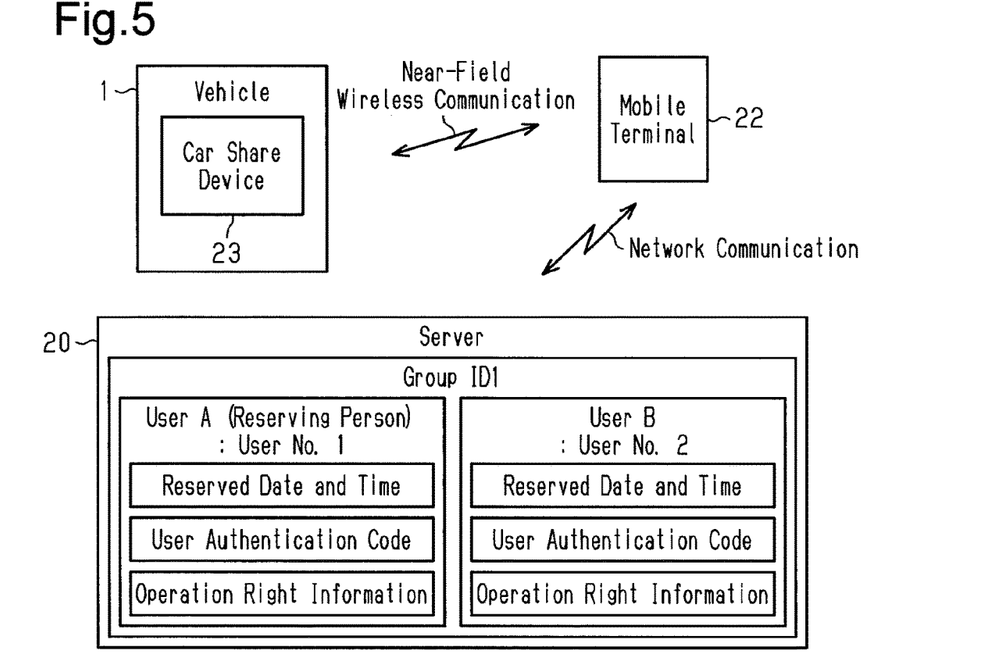
FIG. 5 is a block diagram illustrating an example system allowing other users in the same group to use the rented vehicle.

FIG. 5 illustrates a system that allows for multiple users (user A and B) of the same group (group ID1) to use the vehicle 1. The server 20 registers user B in the same group as user A based on the usage request information of user B received via the mobile terminal 22 of user A. In the present example, the server 20 associates user B with group ID1 of user A. The reserved date and time included in the usage request information of user B are also associated with group ID1.

Returning to FIG. 4, in step S303, the server 20 generates the code information Dk assigned to user B based on usage request information of user B. In this case, the server 20 generates code information Dk that differs from the code information of user A. For example, in the same manner as in step S102, the server 20 uses an encryption expression (encryption algorithm) to encrypt plain text with the car share device unique encryption code and obtain the encrypted text as the code information Dk. The code information Dk of user B includes the group ID (in the present example, group ID1), the reserved date and time, the terminal ID, the user authentication code, and the operation right information. The user authentication code included in the code information Dk of user B differs from the user authentication code included in the code information Dk of user A. The server 20 associates the reserved date and time, the user authentication code, and the operation right information, which are included in the code information Dk of user B, to group ID1 of user A (refer to FIG. 5).

In step S304, the server 20 transmits the code information Dk of user B to the mobile terminal 22 of user B. Then, when the mobile terminal 22 of user B is connected through communication connection with the car share device 23 of the vehicle 1, the car share device 23 performs processes that are the same as steps S104 to S107 of FIG. 2 to authenticate the code information Dk of user B. After authenticating the code information Dk of user B, the car share device 23 obtains the group ID (group ID1), the reserved date and time, the user authentication code, and the operation right information.

Even when, for example, the date and time reserved by user B to use the vehicle 1 is the same as the date and time reserved by user A to use the vehicle 1, as long as user A and user B belong to the same group, the usage right lending unit 41 allows user B to use the vehicle 1. In the present example, when the code information Dk of user B is authenticated, the car share device 23 acknowledges that user A and user B are associated with the same group ID (group ID1). Thus, user B is allowed to use the vehicle 1 even when the reserved date and time of user B is the same as the reserved date and time of user A.

When the code information Dk of user B is authenticated and user A and user B belong to the same group, the car share device 23 performs a process that is the same as step S108 of FIG. 2 to transmit the user authentication code of user B to the mobile terminal 22. Then, the car share device 23 performs processes that are the same as steps S109 to S111 of FIG. 2. After the mobile terminal 22 of user B and the car share device 23 are both authenticated, the mobile terminal 22 of user B is allowed to be used in place of the electronic key 2 as an electronic key (vehicle key) of the vehicle 1.

Figure 6:
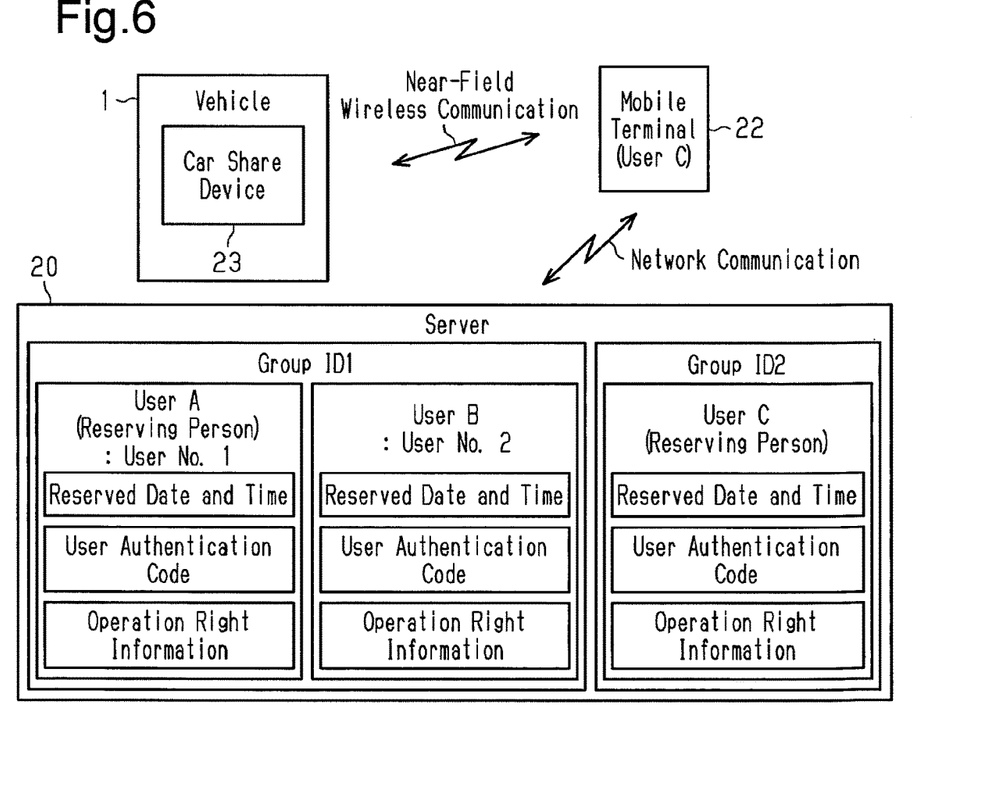
FIG. 6 is a block diagram illustrating an example system allowing the user of another group to use the vehicle.

FIG. 6 is an example system that allows user C to use the vehicle 1. User C belongs to a group that differs from the group to which users A and B belong. FIG. 6 illustrates an example in which user C uses his or her mobile terminal 22 reserve the vehicle 1 without sending a usage request through the mobile terminal 22 of user A or user B. In this case, the server 20 performs steps S101 and S102 to assign group ID2 to user C. Group ID2 of user C differs from group ID1 of users A and B. Then, process that are the same as steps S103 to S107 are performed to authenticate the code information Dk of user C. The car share device 23 acknowledges that group ID2, which is included in the code information Dk of user C, differs from group ID1 of users A and B. Then, in processes that are the same as steps S108 to S111 of FIG. 2, the mobile terminal 22 of user C and the car share device 23 are both authenticated. This allows the mobile terminal 22 of user C to be used in place of the electronic key 2 as an electronic key (vehicle key) of the vehicle 1.

When the mobile terminal 22 of user C, who is associated with group ID2 that differs from group ID1, is valid and user C is using the vehicle 1, the mobile terminals 22 of users A and B associated with group ID1 are invalid. Thus, users A and B cannot use the vehicle 1. More specifically, when the usage right lending unit 41 accepts a usage reservation of the vehicle 1 from user C associated with group ID2, which differs from group ID1, the usage right lending unit 41 allows user C to use the vehicle 1 as long as the vehicle 1 is not being rented to users A and B.

The advantages of the car sharing system 21 will now be described.

The car sharing system 21 includes the usage right lending unit 41 that allow a number of users including a first user and a second user to use the vehicle 1. If the second user sends a usage request for the vehicle 1 while the vehicle 1 is being rented to the first user, the usage right lending unit 41 allows the second user to use the vehicle 1 as long as the user satisfies the lending condition. In the present embodiment, the lending condition may be the second user belonging to the same group as the first user. However, the lending condition is not limited. With this configuration, multiple users are allowed to use the same vehicle 1. This improves convenience for the users of the car sharing system 21.

The usage right lending unit 41 allows multiple users to use the vehicle 1 during the same period based on the group ID assigned to the users. With this configuration, a simple process for checking the group ID allows for determination of whether a different user wishing to use the rented vehicle 1 is an authorized user.

Even when second user reserves the vehicle 1 on the same date and time as the first user, the usage right lending unit 41 allows the second user to use the vehicle as long as the second user is assigned with the same group ID as the first user. With this configuration, the vehicle 1 can be rented during the same period to multiple users that reserve the vehicle on the same date and time.

When the vehicle 1 is used for the first time, the server 20 transmits the code information Dk, which includes the group ID, to the mobile terminal 22. When the car share device 23 authenticates the code information Dk, the car share device 23 obtain the group ID from the code information Dk. With this configuration, the code information Dk transmitted from the server 20 to the mobile terminal 22 includes the group ID. Thus, the group ID can be securely sent to the mobile terminal 22 and the car share device 23.

It should be apparent to those skilled in the art that the foregoing embodiments may be implemented in many other specific forms without departing from the scope of this disclosure. Particularly, it should be understood that the foregoing embodiments may be implemented in the following forms.

The lending condition for lending the vehicle 1 to the second user (user B) does not have to be the group ID being the same as that of the first user (user A) who is presently lending the vehicle 1. For example, the server 20 assigns usage permission information, which indicates acceptance of a usage request from the second user, to the mobile terminal 22. In this case, when the car share device 23 (usage right lending unit 41) receives the usage permission information from the mobile terminal 22, the second user is allowed to use the vehicle 1.

When the second user (user B) sends a usage request for the vehicle 1, instead of sending the usage request to the first user (user A), the second user (user B) may send the usage request, for example, directly to the server 20. In this case, the server 20 may store information indicating whether or not the first user has permitted users other than the second user to use the vehicle 1.

The usage request of the second user (user B) does not have to be sent to the server 20. For example, the usage request may be sent to only the first user (user A). In this case, for example, based on the usage request from the second user, the first user may transmit second user information (group ID, reservation information, terminal ID, user authentication code, and operation right information) to the car share device 23.

The group ID does not have to be included in the code information Dk and sent to the mobile terminal 22 and the car share device 23. For example, only the group ID may be separately sent to the mobile terminal 22 and the car share device 23.

The mobile terminal 22 and the car share device 23 may obtain the user authentication code through any procedure or process.

The code information Dk does not have to be encrypted by the car share device unique encryption code and may be encrypted by any other encryption code.

The content of the code information Dk may be changed to one other than that of the above embodiment.

The code information Dk does not have to be generated by the server 20 and may be generated by any other external device.

The condition for switching the key function unit 38 from an invalid state to a valid state is not limited to the condition described above and may be any other condition.

The engine 6 may be started by, for example, operating an "engine start" button shown on the display of the mobile terminal 22.

In the smart verification of the key-operation-free system (electronic key system 4), the exterior transmitter and the interior transmitter do not have to be used to determine whether the electronic key 2 is located inside the vehicle 1 or outside the vehicle 1. For example, left and right antennas (LF antennas) may be arranged on the vehicle body, and the combination of the response of the electronic key 2 to the radio waves transmitted from each antenna may be checked to determine whether the electronic key 2 is located inside the vehicle 1 or outside the vehicle 1.

The smart verification of the electronic key system 4 does not have to perform both electronic key ID verification and challenge-response authentication. As long as electronic key TD verification is performed, any verification process may be performed. Further, any verification may be performed in lieu of the challenge-response authentication.

In the electronic key system 4, instead of using the verification ECU 9, the electronic key 2 may initiate wireless communication and execute electronic key ID verification.

The electronic key 2 is not limited to a Smart Key (registered trademark) and may be any other wireless key.

The near-field wireless communication is not limited to Bluetooth communication and may be of any type of communication protocol.

The code information Dk is not limited to a one-time key and may be any information of which use is restricted.

The encryption code used for encrypted communication may be, for example, any one of the car share device unique encryption code, the user authentication code, and the electronic key unique encryption code. For example, the encryption code used during a process may be switched to improve communication security.

Communication between the verification ECU 9 (electronic key system 4) and the car share device 23 is not limited to wireless communication and may be wired communication.

There is no limit to where the car share device 23 can be installed.

The mobile terminal 22 is not limited to a smartphone and may be any other mobile terminal.

All examples and conditional language recited herein are intended for pedagogical purposes to aid the reader in understanding the principles of the invention and the concepts contributed by the inventors to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. A car sharing system, comprising:
a car share device installed in a vehicle and configured to verify an electronic key ID used by an electronic key system of the vehicle, the car sharing device including one or more processors and a memory storing instructions, which when executed by the one or more processors, cause to the car share device to
communicate with a mobile terminal that is operable as a vehicle key when code information is registered to the mobile terminal,
authenticate the code information through wireless communication with the mobile terminal and permit actuation of an on-board device by verifying the electronic key ID with the electronic key system when the mobile terminal is operated to actuate the on-board device, and
function as a usage right lender that allows multiple users including a first user and a second user to use the vehicle,
wherein when the second user sends a request to the first user for usage of the vehicle when the vehicle is being rented to the first user, the usage right lender, upon receipt of the second user request from the first user, allows the second user to use the vehicle as long as the second user satisfies a lending condition,
wherein the usage right lender permits the multiple users to use the vehicle during the same period based on a group ID assigned to the multiple users, and
even when the second user reserves the vehicle on the same date and time as the first user, the usage right lender allows the second user to use the vehicle as long as the same group ID is assigned to the first user and the second user.

2. The car sharing system according to claim 1, wherein the code information includes the group ID, the code information including the group ID is transmitted to the mobile terminal from an external device when using the vehicle for a first time, and
the car share device obtains the group ID from the code information when the code information has been authenticated.

3. The car sharing system according to claim 1, wherein the first user and the second user are associated with a first group ID, and
when the usage right lender accepts a request for usage of the vehicle from a third user associated with a second group ID that differs from the first group ID, the usage right lender allows the third user to use the vehicle as long as the vehicle is not being rented to the first user and the second user.

* * * * *